United States Patent Office 3,753,949
Patented Aug. 21, 1973

3,753,949
POLYESTERS WITH IMPROVED DYEABILITY
Gene Clyde Weedon, Richmond, Va., assignor to
Allied Chemical Corporation, New York, N.Y.
No Drawing. Filed Nov. 16, 1971, Ser. No. 199,353
Int. Cl. C08g 17/14
U.S. Cl. 260—49     5 Claims

ABSTRACT OF THE DISCLOSURE

Cationic dyeable linear polyesters useful for making films and filaments having incorporated therein, based on the total amount of the glycol used in preparing said polyesters, from about 0.01 to about 15 mole percent of a sulfonate compound of the formula:

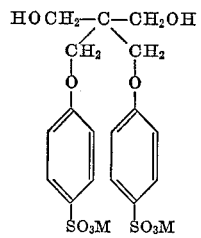

wherein M is selected from the group consisting of alkali metals and ammonium.

BACKGROUND OF THE INVENTION

This invention relates to new polyester polymers. The invention also relates to fibers, filaments, yarns, films, and other structures of said polymers, which have an affinity for dyestuffs.

Linear polyesters are well known and are readily prepared by the reaction of dihydric alcohols or their functional derivatives with dibasic carboxylic acids and their ester forming derivatives. Thus, for example, polyethylene terephthalate may be produced either by the ester interchange reaction between dimethyl terephthalate and ethylene glycol or the so-called direct esterification method as initially enunciated in U.S. Pat. 2,465,310 and more recently in U.S. Pats. 3,024,220; 3,050,533 and 3,050,548.

Although the processes for preparing linear polyesters that are useful in making films and fibers have been relatively successful, many problems remain, particularly in dyeing the fiber and products made therefrom. For example, when various dye ingredients, such as phosphonates, sulfones and various sulfonates are used, they adversely affect the final physical properties of the product, thus making such products unsuitable in the market place. Some previous efforts by those skilled in the art to overcome polyester dyeing problems are illustrated in U.S. Pats. 3,164,566; 3,164,567 and 3,164,570, and such patents are hereby incorporated by reference. Therefore, an improved dyeable linear polyester suitable for use in preparing fibers and films and allowing greater end uses for these products as well as the process for preparing said polyester would make a substantial contribution to this art.

SUMMARY OF THE INVENTION

In view of the foregoing, it is an object of the present invention to provide a modified linear polyester suitable for use in making films and filaments. Another object of this invention is to provide a new linear polyethylene terephthalate polymer suitable for use in making films and filaments that are readily dyeable by ordinary dyeing techniques while at the same time retaining excellent heat stability, dimensional stability and strength. A further object of this invention is to provide an improved process for preparing a new linear polyester polymer suitable for use in making films and filaments of improved dye receptivity. Still another object of the present invention is to provide an improved process for preparing a cationic dyeable modified polyethylene terephthalate polymer suitable for use in making films and filaments.

These and other objects and advantages which will be obvious hereinafter are achieved by the present invention which is set forth in the following description wherein parts and percentages are by weight.

The modified linear polyesters of this invention are prepared essentially from an aromatic dicarboxylic acid, or a dialkyl ester thereof, with a diol, desirably an aliphatic glycol containing from 2 to 10 carbon atoms, and a small amount of a sulfonate compound of the general formula:

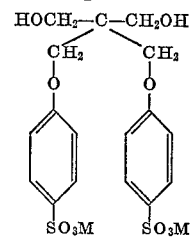

wherein M is selected from the group consisting of lithium, sodium, potassium, rubidium, cesium, and ammonium. A preferred class of such polyesters is prepared from terephthalic acid, or an ester forming derivative thereof, and an aliphatic glycol wherein the aliphatic glycol is present during the reaction in amounts ranging from 1.1 to 2.0 moles of aliphatic glycol per mol of dicarboxylic acid in the presence of 0.01 to 15 mole percent, preferably 0.1 to 5.0 mole percent, based on the aliphatic glycol, of a sulfonate compound of the formula:

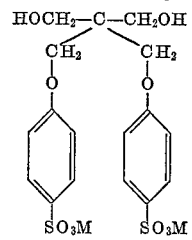

wherein M is preferably selected from the group consisting of sodium and potassium.

The di-(p-sulfophenoxy)-neopentyl glycol compounds of the present invention are members of a class of novel compounds that are readily prepared from dibromoneopentyl glycol. Thus, for example, the compound represented by the formula:

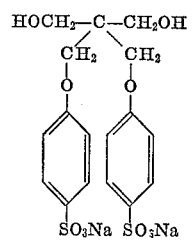

can be prepared by refluxing an aqueous sodium hydroxide solution of phenol sulfonic acid, sodium salt, with dibromoneopentyl glycol. The instant sulfonated compounds are extremely heat stable, colorless, and capable of being used in both dimethyl terephthalate and terephthalic acid polymerization processes for production of polyesters. Moreover, the novel sulfonated compounds are relatively inexpensive.

Suitable diols for the production of the polyesters of this invention are the aliphatic diols represented by the general formula $HO(CH_2)_nOH$ wherein $n$ is an integer of from 2 to 10, such as ethylene glycol, trimethylene glycol, hexamethylene glycol, decamethylene glycol, and the like. Also suitable are 1,4-cyclohexanedimethanol, p-xylylene glycol, and the like. It is known that any glycol of an aliphatic nature, whether or not it contains aromatic nuclei, can be used in the production of linear polyesters. Thus, the term aliphatic glycols includes all those glycols of an aliphatic nature which are known to the art to be suitable.

The preferred dicarboxylic acid compounds for the production of the polyesters of this invention are the aromatic dicarboxylic acids, which are well known to those skilled in the art. The most preferred dicarboxylic acid is terephthalic acid and the dialkyl esters thereof, such as dimethyl terephthalate and similar esters in which the alkyl groups preferably contain from 1 to 5 carbon atoms.

It will be understood that the linear polyesters of this invention contain the recurring units represented by the following general formulae:

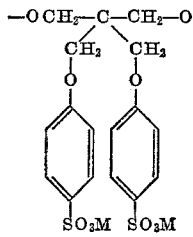

from the above-described sulfonated compound modifiers;

—OC—aromatic nucleus—CO— from the aromatic dicarboxylic acid compounds; and

—O—aliphatic nucleus—O— from the aliphatic glycols as defined above, wherein the recurring units are attached to one another so as to form an ester link

The basic or cationic dye useful in this invention is a colored organic substance such as those containing sulfonium, oxonium, or quaternary ammonium functional groups.

In producing the dyeable linear polyesters of this invention, the calculated amounts of aryl dicarboxylic acid compound, glycol, sulfonated compound modifier, and catalyst are charged to a reactor and heated at a temperature of from about 150° C. to about 270° C. in an inert atmosphere to effect the initial interchange reaction. Then excess glycol is removed by heating to about 280° C. at reduced pressure in an inert atmosphere. Thereafter, the polycondensation is carried out at from about 260° C. to about 300° C. at reduced pressures of from about 0.1 mm. to about 10 mm. of mercury, also in an inert atmosphere. The total reaction period can be from about one to about fifteen hours, according to the catalyst employed, the temperature, the pressure, the starting monomers, and the viscosity desired for the polyesters, as is known in the art.

The monomers are normally reacted in contact with a suitable catalyst in order to shorten the reaction period. Any of the well known polyesterification catalysts can be used such as antimony oxide, zinc acetate, manganese acetate, cobaltous acetate, zinc succinate, and the like. The concentration of the catalyst can be varied from about 0.001 percent to about 1 percent by weight of the total amount of dicarboxylic acid compounds charged.

Unexpectedly, the instant sulfonated compound modifiers have sufficient stability, both chemically and thermally, to withstand the polycondensation conditions in the presence of other reactants, as well as the high temperatures necessary for spinning the polyesters. It was also surprising that the dye receptivity in basic dyes of the fiber forming polyesters prepared in accordance with this invention is increased substantially, namely, up to ten fold over that of fiber forming polyesters prepared in a way other than in accordance with this invention. Further, the modified polyesters of this invention showed no disadvantage in physical properties over unmodified polyester fibers.

DESCRIPTION OF THE PREFERRED EMBODIMENT

In order to demonstrate the invention, the following examples are given:

Example 1

This example demonstrates preparation of (di-sodio-sulfophenoxy)neopentyl glycol, a preferred polyester modifier of the present invention. About 10 grams of sodium hydroxide was dissolved in 500 grams of water and the solution was heated to reflux temperature. Next, 58 grams of phenol sulfonic acid (para), sodium salt (hydrate, $2H_2O$), was dissolved in the solution. Then, 32.8 grams of dibromoneopentyl glycol was added and the reaction mixture was refluxed for 3 hours. No precipitate was formed when the reaction mixture was cooled to room temperature but the product crystallized on cooling the mixture in an ice bath. The solid product was separated by filtration and dried in a vacuum oven. This material weighed 29.6 grams. The precipitate was subsequently extracted with ethanol in a Soxhlet extractor. After drying the alcoholic extract, 23.4 g. of product was recovered. Sulfur analysis of the extracted product indicated that the desired sulfonate was obtained having the following structure.

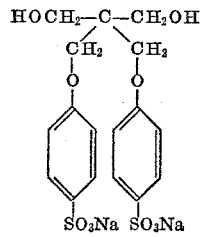

The product compound was colorless and extremely heat stable. That is, the compound was stable at temperatures normally used in production of polyesters. Melting point was 408° C. Example 2 shows that the novel compound is readily incorporated into polyesters and that the resulting polyesters are heat stable and have improved dyeability.

The corresponding potassium sulfonate compound is prepared in a similar manner by substituting equivalent amounts of potassium hydroxide and phenol sulfonic acid (para), potassium salt, in the above procedure.

Example 2

A glass reactor was charged with a mixture of 739.3 grams of ethylene glycol, 1164.0 grams of dimethylerephthalate, 35.0 grams of di(sodiosulfophenoxy)neopentyl glycol (prepared in accordance with Example 1), and 0.41 gram of manganese acetate. The mixture was then flushed with nitrogen and was then heated to 200° C. over a five hour period at atmospheric pressure to produce an ester interchange reaction. Methanol distilled off continuously during the ester interchange reaction and the distillation was practically completed when the temperature reached 200° C. The reaction mass was then cooled to room temperature and the reactor was opened. Next, 2.28 grams of antimony tristallate and 3.25 grams of trinonylphenylphosphite were added to the reaction mass. The reactor was closed and the reaction mass was again flushed with nitrogen and was then heated to 275° C. over a one hour period to produce a polymerization reaction. Heating was continued at 275° C. for an additional five hours under increasing vacuum to a final vacuum of 0.08 mm. Hg. Nitrogen was then admitted to the reactor and a small pressure was maintained while the polyester copolymer was extruded from the reactor in the form of a polymer ribbon. The polyester copolymer ribbon was subsequently cooled and pelletized using a Wiley Mill. The polyester copolymer was a clear solid having a reduced viscosity of about 0.73 in orthochlorophenol and a melting point of about 246° C. The reduced viscosity was calculated using the following equation:

$$n_{red} = (n_r - 1)/C$$

where:

$n_{red}$=reduced viscosity
C=concentration of dissolved polymer in grams/100 ml.
$n_r$=relative viscosity=$t_p/t_s$ (flowtime polymer solution/flowtime solvent)

The polyester copolymer pellets were dyeable with basic dyestuffs to a good shade.

This polyester copolymer was designated polymer A.

Example 3

For comparative purposes, a polymer was prepared in a manner similar to polymer A of Example 2 except that no di(sodiosulfophenoxy)neopentyl glycol was added to the initial ingredients. The resulting polymer was designated polymer B. Polymer B had a melting point of 254° C. and a reduced viscosity of about 0.72 in orthochlorophenol.

Example 4

Polymer A and B of Example 2 and Example 3 were dried in a vacuum oven at 150° C. for 16 hours and spun on a one-inch extruder. The extrusion and spin block temperatures were about 295° C. Polymers A and B were drawn at a draw ratio of 4.0 to 1 into 70-denier, 16-filament yarns, which were knitted into Sleeve A and Sleeve B, respectively. A swatch from each sleeve was cationically dyed with Nabor Blue B (C.I. Basic Blue 21) according to the following procedure:

Each fabric sample was dyed in an aqueous dye bath containing:

10.0% (on weight of fabric) Nabor Blue B (C. I. Basic Blue 21)
1.6% (on weight of fabric) glacial acetic acid
0.6% (on weight of fabric) sodium acetate.

The weight of dye bath to fabric was maintained at 30:1. The fabric sample was immersed in the aqueous dye bath at 80° C. in an autoclave. The temperature was raised to 140° C. at the rate of three degress per minute and was maintained at 140° C. for three hours. The fabric sample was then rinsed in warm water and dried.

The dye uptake of the samples from Sleeve A and Sleeve B was measured by dissolving 0.1 gram of each dyed sleeve in a mixture of 1.5 ml. of monochlorobenzene and 1.5 ml. of melted phenol. The resulting solution was diluted with acetone to volume of 25 ml. The solution was then centrifuged to separate precipitated polymer, and the light absorbency (at 550 nanometers) of the dissolved dye solution was measured. Sleeve A (containing sulfoante additive) had an absorbency per unit weight ratio of $1.2 \times 10^{-3}$. Sleeve B (without sulfonate additive) had an absorbency per unit weight ratio of only $0.5 \times 10^{-3}$. Visually, Sleeve A was observed to dye to a much greater extent than Sleeve B.

I claim:

1. A cationic dyeable linear high molecular weight fiber and film forming polyester consisting essentially of the condensation product of (a) a dicarboxylic acid compound selected from the group consisting of aromatic dicarboxylic acid and the dialkyl ester thereof; (b) an aliphatic glycol containing from 2 to 10 carbon atoms; and, based upon the total amount of said aliphatic glycol, (c) from about 0.01 to about 15 mole percent of a sulfonate compound of the general formula:

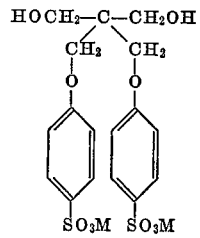

wherein M is selected from the group consisting of lithium, sodium, potassium, rubidium, cesium, and ammonium.

2. The polyester of claim 1 wherein the dicarboxylic acid compound is selected from the group consisting of terephthalic acid and the dialkyl ester thereof, said alkyl groups containing from 1 to 5 carbon atoms.

3. The polyester of claim 1 wherein the aliphatic glycol is ethylene glycol.

4. The polyester of claim 1 wherein the dicarboxylic acid compound is dimethyl terephthalate and the aliphatic glycol is ethylene glycol.

5. The polyester of claim 1 wherein from about 0.1 to 5 mole percent of the sulfonate compound, based on the total amount of glycol, is incorporated in the polyester.

References Cited

UNITED STATES PATENTS

| | | | |
|---|---|---|---|
| 3,238,180 | 3/1966 | Wiloth | 260—47 |
| 3,624,034 | 11/1971 | Price et al. | 260—49 |
| 3,663,508 | 3/1972 | Mobius et al. | 260—49 |
| 3,664,984 | 5/1972 | Duddey | 260—22 |

WILLIAM H. SHORT, Primary Examiner
L. L. LEE, Assistant Examiner

U.S. Cl. X.R.

8—179; 260—334 P, 512 R

PO-1050
(5/69)

UNITED STATES PATENT OFFICE
CERTIFICATE OF CORRECTION

Patent No. 3,753,949        Dated August 21, 1973

Inventor(s) Gene C. Weedon

It is certified that error appears in the above-identified patent and that said Letters Patent are hereby corrected as shown below:

Column 4, line 58, "dimethyler-" should be --dimethylter- --.

Column 5, line 50, "degress" should be --degrees--.

Column 6, line 3, "sulfoante" should be --sulfonate--.

Signed and sealed this 20th day of August 1974.

(SEAL)
Attest:

McCOY M. GIBSON, JR.        C. MARSHALL DANN
Attesting Officer           Commissioner of Patents